United States Patent

Poumakis

[15] 3,676,868

[45] July 11, 1972

[54] RANDOM ACCESS MAGNETIC STORAGE SYSTEM WITH MOVABLE TRANSDUCER

[72] Inventor: Eleuthere Poumakis, 50 Oak Court, Danville, Calif. 94526

[22] Filed: Dec. 10, 1969

[21] Appl. No.: 886,311

Related U.S. Application Data

[63] Continuation of Ser. No. 581,593, Sept. 23, 1966, abandoned.

[52] U.S. Cl. ........................................ 340/174.1 C
[51] Int. Cl. ........................................ G11b 21/08
[58] Field of Search............... 340/174.1 B, 174.1 C, 174.1 F, 340/174.1 J; 179/100.2 MI

[56] References Cited

UNITED STATES PATENTS 2,815,168 12/1967 Zukin.............................. 340/174.1 C
3,209,338 9/1965 Romuari.......................... 340/174.1 J
3,119,987 1/1964 Slavin.............................. 340/174.1 J
3,399,391 8/1968 Barrosse.......................... 340/174.1 C

*Primary Examiner*—Vincent P. Canney
*Attorney*—Lane, Aitken, Dunner & Ziens

[57] ABSTRACT

In a random access magnetic storage system, a set of transducers are positioned by means of a mechanical linkage in response to the positions of solenoid operated control means. The system generates a motion anticipation signal upon the registration of each new address in an address register if the new address requires movement of the set of transducers. The transducers are disabled until the transducers are positioned in their new position in response to a motion anticipation signal. If no motion anticipation signal is produced the transducing operations are permitted immediately after registration of the new address in the address register.

15 Claims, 5 Drawing Figures

INVENTOR

Eleuthere Poumakis

BY Lane, Aitken, Dunner & Ziems

ATTORNEYS

INVENTOR
Eleuthere Poumakis

BY Lane, Aitken, Dunner & Ziems
ATTORNEYS

RANDOM ACCESS MAGNETIC STORAGE SYSTEM WITH MOVABLE TRANSDUCER

This application is a continuation of application Ser. No. 581,593, filed Sept. 23, 1966 and now abandoned.

This invention relates to magnetic storage systems, and more particularly, to a random access magnetic tape storage system of the type in which information is stored in a plurality of different magnetic tracks and access is obtained to the information in different tracks by moving a transducer to the different tracks.

In copending application Ser. No. 535,747, titled Random Access Memory, invented by Andrew Gabor, filed Mar. 21, 1966 now U.S. Pat. No. 3,505,661, there is disclosed a magnetic storage system in which information is stored in magnetic tracks defined on a plurality of endless belts. In this system a plurality of magnetic transducers are mounted in a bar which is movable to 32 incrementally spaced positions so that each transducer mounted in the bar is movable to 32 different tracks. The movement of the bar is controlled by five solenoids each of which has two output positions. Each different combination of positions of the solenoids results in a different position of the bar carrying the transducers. The solenoids are controlled in accordance with the address stored in an address register. Each time a new address is stored in the address register, the solenoids will be energized to move to the combination of positions called for by the new address to move a transducer opposite the track selected by the new address unless the new address selects a track opposite which a transducer is already positioned. Access to the track selected by the new address may not be had until the solenoids have completed their movement to the new combination of positions designated by the new address. However, if the new address selects a track opposite which there is already a transducer, the solenoids will already be at the combination of positions designated by the new address and access may be had to the selected track without waiting for the solenoids to move.

The system of the present invention provides a unique means for determining when the new address does not require movement of the solenoids so that the time required to gain access to the selected track is greatly reduced.

Accordingly, an object of the present invention is to provide an improved magnetic storage system.

Another object of the present invention is to reduce the time to gain access to desired information in a magnetic storage system.

A further object of the present invention is to provide in a magnetic storage system a means to indicate when no motion of transducers is required to gain access to information stored by the system so that the access time may be reduced.

In accordance with the present invention, silicon controlled rectifiers are used both as means to drive the solenoids and as storage devices to compare the combination of positions of the solenoids selected by the new address with that selected by the preceding address. This comparison provides the indication as to whether or not the new address requires the solenoids to move to a new combination of positions. Because of this indication of whether or not motion is required, access to the selected track may be had immediately in those cases in which no movement is required.

The manner in which the silicon controlled rectifiers are used both as drivers and as a memory for comparison with a preceding condition is also useful in applications other than magnetic storage systems. Accordingly, a still further object of the present invention is to provide a unique control circuit in which electronic valves of the silicon controlled rectifier type are used both to drive an output device and as a memory to provide a comparison with a preceding condition.

Further objects and advantages of the present invention will become readily apparent as the following detailed description of the invention unfolds and when taken in conjunction with the drawings wherein:

FIG. 1 schematically illustrates the magnetic storage system of the present invention;

Figure 1:
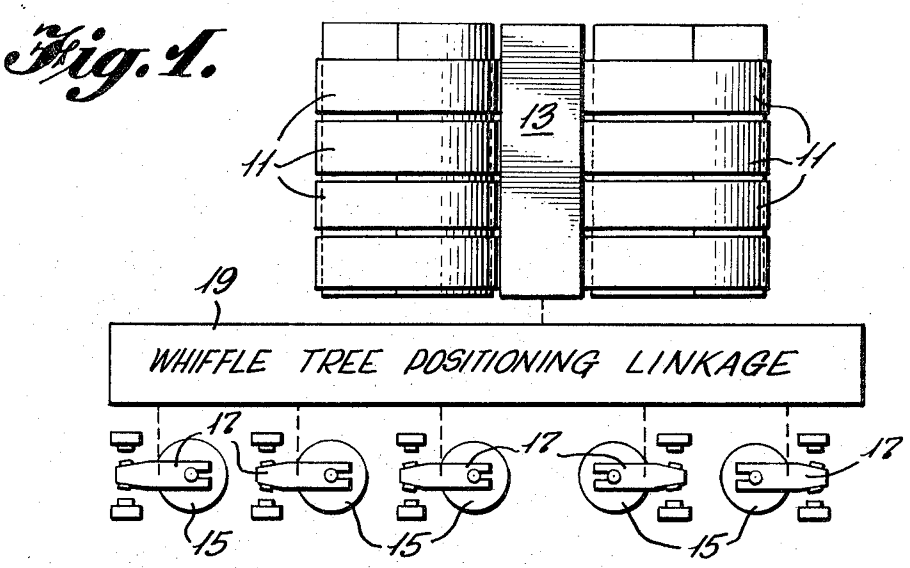

As shown in FIG. 1, the magnetic storage system of the present invention comprises a plurality of magnetic tapes 11 in the form of endless belts which are driven past a plurality of magnetic transducers mounted on a bar 13. The transducers are distributed along the length of the bar so that they are operable to perform transducing operations in different magnetic tracks defined on the magnetic tapes 11. The bar 13 can be moved laterally across the tapes 11 to position each transducer for transducing operations in different tracks.

The positioning of the bar 13 is controlled by five rotary solenoids 15, each of which has an armature 17 in the form of an actuating arm selectively movable to one of two positions. The armatures 17 are connected to the bar 13 through a whiffle tree positioning linkage 19. The linkage 19 will position the bar 13 in 32 incrementally spaced positions in response to different combinations of positions of the armatures 17. Each different combination of positions of the armatures 17 will result in a different position of the bar 13. In this manner, each transducer mounted on the bar 13 can be selectively moved to any one of 32 different tracks simply by controlling the solenoids 15 to move the armatures 17 to the combination of positions corresponding to the selected track.

This magnetic storage system schematically illustrated in FIG. 1 is fully disclosed in the above-mentioned copending application Ser. No. 535,747.

This copending application, which is assigned to the assignee of the present application, includes a detailed disclosure of the whiffle tree positioning linkage.

Figure 2:
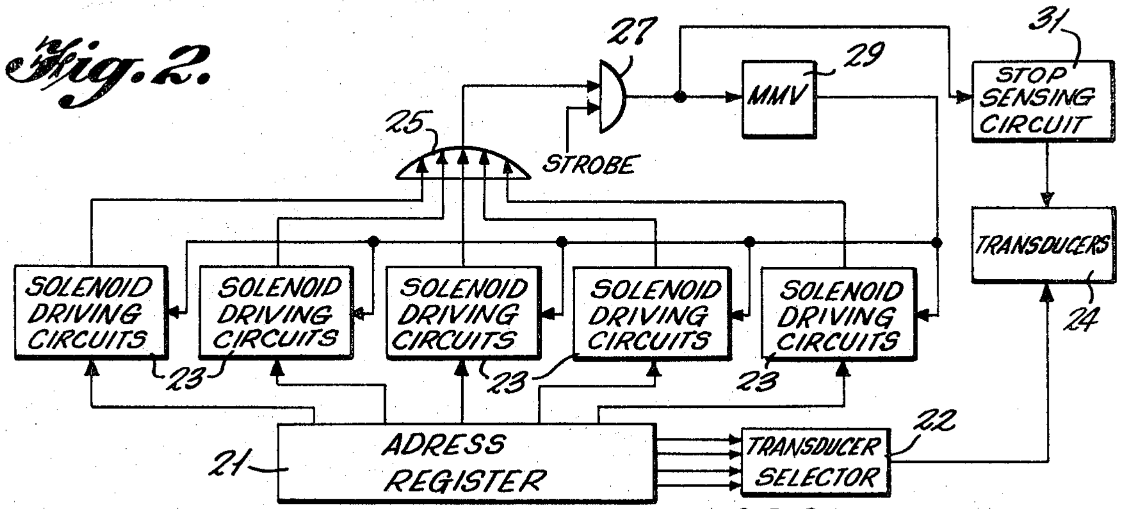
FIG. 2 is a block diagram of the circuitry of the system of the present invention.

The solenoids 15 are energized to move their armatures 17 to a selected combination of positions in accordance with an input address which designates a particular track on the magnetic tapes 11 for transducing operations. As shown in FIG. 2, this address will be stored in an address register 21. When a new address is stored in the address register 21, the solenoids 15 will be energized to move their arms to a combination of positions corresponding to the new address whereupon the whiffle tree positioning linkage 19 will reposition the bar 13 in accordance with the new combination of positions of the armatures 17.

A portion of the address stored in the address register 21 is used to select one of the transducers 13 and signals are fed from the address register 21 to a selecting circuit 22, which selects one of the transducers mounted in the bar 13 in a conventional manner for transducing operations in response to the applied signals. In FIG. 2, the transducers are designated by the reference number 24. In this manner, one out of a large number of tracks is selected by the address registered in the address register for transducing operations.

The actuation of the solenoids 15 and the movement of the bar 13 takes time and transducing operations cannot begin until the movement of the bar 13 to the new position is completed. However, not all new addresses which are stored in the address register 21 require that the bar 13 be moved. The new address may specify a track opposite which a transducer is already positioned so that the bar 13 is not required to be moved. In such instances, to save time in gaining access to the selected track, it is desirable to provide an indication that no movement of the bar is going to take place so that the transducing operations may begin immediately without any waiting period for the bar 13 to complete its movement. The system of the present invention detects whether or not the new address requires movement of the bar 13 and, if not, immediately provides an output signal indicative of this fact which enables the transducers for transducing operations immediately.

As shown in FIG. 2, signals representing the address stored in the address register 21 are applied to solenoid driving circuits 23, each of which will drive one of the solenoids 15 to a position in accordance with the address stored in the address register 21. Each of the solenoid driving circuits 23 will apply an enabling output signal to an OR-gate 25 if such solenoid driving circuit receives a signal from the address register 21 to cause it to change the position of the actuating arm 17 of its corresponding solenoid 15. The output of the OR-gate 25 is applied to an AND-gate 27, which receives a strobe pulse a few microseconds after a new address is registered in the address register 21. When one or more of the solenoid driving circuits 23 has received a signal from the address register 21, which will cause it to change the position of the actuating arm of its corresponding solenoid, the AND-gate 27 will receive an enabling signal from the OR-gate 25. Then when the strobe pulse is applied to the AND-gate 27, the strobe pulse will pass through the AND-gate 27 to trigger a monostable multivibrator 29.

If the new address applied to the address register 21 is such that it will not cause any of the solenoid driving circuits to change the position of the actuating arm of its corresponding solenoid, then the OR-gate 25 will not receive an enabling signal from any of the solenoid driving circuits 23 and the AND-gate 27 will not be enabled at the time the strobe pulse is applied thereto. Accordingly, the monostable multivibrator 29 will not be triggered.

The output pulse produced by the monostable multivibrator 29, in response to being triggered, is applied to the solenoid driving circuits 23. This pulse from the monostable multivibrator 29 is used to control the driving circuits 23 so that they complete the energization of the coils of their respective solenoids in accordance with the address stored in the address register 21. Details of the solenoid driving circuits are described below with reference to FIG. 3.

The strobe pulse passing through the AND-gate 27 is also applied to a stop sensing circuit 31 to indicate to the stop sensing circuit 31 that the bar 13 carrying the transducers is going to be moved to a different position. The strobe pulse upon passing through the AND-gate 27 accordingly is called a motion anticipation pulse. In response to receiving the motion anticipation pulse from the AND-gate 27, the stop sensing circuit 31 will disable the transducers 24 mounted in the bar 13 so that they cannot perform transducing operations until the bar is properly positioned in its new position.

The circuit 31 determines when the bar 13 is finally positioned in this new position by contacts which are mounted on the ends of the arms 17 of the solenoids 15. The contact on each arm 17 will be closed when the arm 17 is in either of its two positions. When an arm 17 is between its two positions, the contact on such arm will be open. By means of these contacts, the stop sensing circuit determines when the bar 13 has completed its motion after receiving a motion anticipation pulse from the gate 27. When the stop sensing circuit detects that the movement of the bar 13 to its new position is completed, it enables the transducers 24 to again permit transducing operations to be carried out.

If the new address stored in the address register 21 will not cause any of the solenoids 15 to change position, the gate 27 will not be enabled and pass the applied strobe pulse. Thus the gate 27 will not apply the motion anticipation pulse to the stop sensing circuit 31 and accordingly the stop sensing circuit 31 will not disable the transducers 24. Accordingly, transducing operations can be performed in the track immediately upon the registration of the new address in the address register 21.

Figure 3:
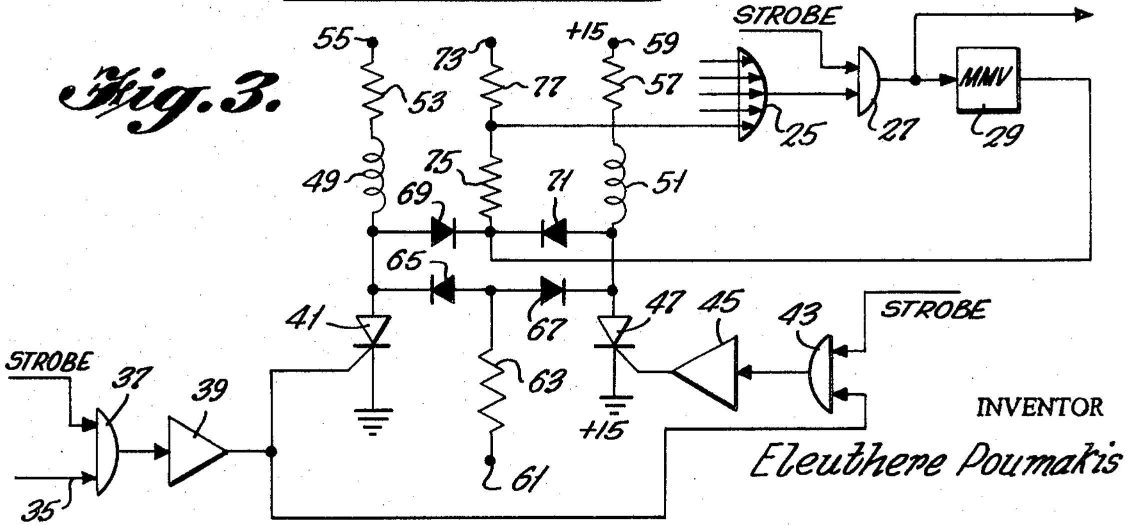
FIG. 3 illustrates the circuitry of the present invention in more detail showing how the silicon controlled rectifiers operate both to drive the solenoids and to compare the positions of the solenoids selected by the new address with that selected by the preceding address.

FIG. 3 illustrates the details of one of the solenoid driving circuits 23 and how it controls the energization of the coils of its corresponding solenoid in response to the signal from the address register. The signal from the address register 21 is applied to the solenoid driving circuit over a channel 35. The applied signal from the address register will have one polarity if the solenoid is to be positioned in one position and will have the opposite polarity if the solenoid is to be positioned in the opposite position.

As shown in FIG. 3, the input signal on channel 35 is applied to a gate 37 which is also connected to receive a strobe pulse. A strobe pulse will be applied to gate 37 whenever a new address is stored in the address register. When a strobe pulse is applied to gate 37, the gate 37 will be enabled and the signal on channel 35 will be passed to an amplifier inverter 39. The amplifier inverter 39 inverts the applied signal and applies it to the gate of a silicon controlled rectifier 41 and to a gate 43. The gate 43 will also be enabled by a strobe pulse whenever a new address is stored in the address register 21. Whenever the gate 43 is enabled, it will pass the signal applied from the amplifier inverter 39 to an amplifier inverter 45, which inverts the applied signal and applies it to the gate of a silicon controlled rectifier 47.

Each of the rotary solenoids 15 has two coils and when one of the coils of the rotary solenoid is energized, it will move its armature 17 to one position and when the other coil of the rotary solenoid is energized, it will move its armature to the opposite position.

The coils of the rotary solenoid which is driven by the circuit shown in FIG. 3 are designated by the reference numbers 49 and 51. The coil 49 is connected in series with a resistor 53 between the anode of the silicon controlled rectifier 41 and a plus 15 volt source applied at a terminal 55. The coil 51 is connected in series with a resistor 57 between the anode of the silicon controlled rectifier 47 and a plus 15 volt source applied at a terminal 59. A plus 15 volt source applied at a terminal 61 is connected through a resistor 63 and a diode 65 to the anode of the silicon controlled rectifier 41 and through the resistor 63 and a diode 67 to the anode of the silicon controlled rectifier 47. The diodes 65 and 67 are poled to permit current flow from the terminal 61 to the silicon controlled rectifiers 41 and 47. The cathodes of the silicon controlled rectifiers are connected to ground. The anode of the silicon controlled rectifier 41 is connected through a diode 69 and a pair of series connected resistors 75 and 77 to a minus 15 volt source applied to a terminal 73. The anode of the silicon controlled rectifier 47 is connected through a diode 71 and the resistors 75 and 77 to the minus 15 volt source at terminal 73. The diodes 69 and 71 are poled to permit current flow from the silicon controlled rectifiers to the terminal 73.

If a negative input signal is applied on channel 35 when the strobe pulses are applied to the gates 37 and 43, a positive signal will be applied to the gate of the silicon controlled rectifier 41 and will cause the silicon controlled rectifier to conduct if it is not already conducting. If a positive signal voltage is applied to the input channel 35 when the strobe pulses are applied to the gates 37 and 43, a positive signal voltage will be applied to the gate of the silicon controlled rectifier 47 to cause the silicon controlled rectifier 47 to conduct if it is not already conducting.

Once one of the silicon controlled rectifies 41 or 47 is rendered conductive, it will be maintained in a conductive state by current flowing from the terminal 61 and from one of the terminals 55 or 59 connected to the anode of the conducting silicon controlled rectifier. Accordingly, when the silicon controlled rectifier 41 is conductive, the coil 49 will be energized and when the silicon controlled rectifier 47 is conducting, the coil 51 will be energized. If the solenoid is not to change positions when a new address is applied to the address register, then the condition of the silicon controlled rectifiers 41 and 47 will remain unchanged when the strobe pulse is applied to the gates 37 and 43. That is, a positive signal voltage will be applied to the gate of the silicon controlled rectifier that is already conducting and will not be applied to the silicon controlled rectifier which is not conducting, so that the silicon controlled rectifier that is already conducting remains conductive and the silicon controlled rectifier that is not conducting remains non-conductive.

If the solenoid is to change positions, then a positive signal voltage will be applied to the silicon controlled rectifier which is not conducting to render this silicon controlled rectifier conductive. At this point, both silicon controlled rectifiers 41 and 47 will be conductive and this condition of the silicon controlled rectifiers 41 and 47 is used to provide the output signal indicating that the solenoid is going to change positions. The output signal applied to the OR-gate 25, as described with reference to FIG. 2, is taken from the junction between the resistors 75 and 77. When only the silicon controlled rectifier 41 is conducting, current will flow from the terminal 61 through the resistor 63, the diode 67, the diode 71 and the resistors 75 and 77 to the terminal 73 so that the junction between the diodes 69 and 71 will be at a positive voltage near 15 volts. The resistance of the resistor 63 is selected to be small relative to the resistance of the resistor 57 and the coil 51 so that very little current flows through the coil 51 when the silicon controlled rectifier 47 is not conducting. Since the anode of the conducting silicon controlled rectifier 41 will be at ground potential, the diode 69 will be back biased. As a result, a low negative voltage will be produced at the junction between the resistors 75 and 77 to be applied to the OR-gate 25. Similarly, if only the silicon controlled rectifier 47 is conducting, current will flow from the terminal 61 through the resistor 63, the diode 65, the diode 69, and the resistors 75 and 77 to the terminal 73 and the diode 71 will be back biased. Accordingly, the same low negative voltage will be applied to the OR-gate 25 from the junction between the resistors 75 and 77 when only the silicon controlled rectifier 47 is conducting. If, however, both silicon controlled rectifiers are conducting, indicating that the solenoid is to move, then the anodes of both the silicon controlled rectifiers 41 and 47 will be at ground potential and current will flow through both of the diodes 69 and 71 making the junction between these diodes near ground potential. As a result, a high negative voltage will be produced at the junction between the resistors 75 and 77 to be applied to the OR-gate 25. Thus, the circuit of FIG. 3 will apply a high negative voltage to the OR-gate 25 to indicate that the solenoid corresponding to the circuit of FIG. 3 is to move and will apply a low negative voltage to the OR-gate 25 to indicate that the solenoid is not going to move.

Each of the solenoid driving circuits is a circuit such as that shown in FIG. 3 and each will apply a high negative voltage to the OR-gate 25 if such circuit is going to cause its corresponding solenoid to move and each will apply a relatively low negative voltage to the OR-gate 25 if such circuit is not going to cause its corresponding solenoid to move. If each of the solenoid driving circuits applies a low negative voltage to the OR-gate 25, the OR-gate 25 will apply a low negative voltage to the AND-gate 27 which will not enable the AND-gate 27. However, if any one of the solenoid driving circuits applies a high negative voltage to the OR-gate 25, indicating that the corresponding solenoid is going to move, such high negative voltage will pass through the OR-gate 25 to the AND-gate 27 and will enable the AND-gate 27. Accordingly, when the strobe pulse, a few microseconds after the application of the strobe pulse to the AND-gates 37 and 43, is applied to the AND-gate 27, the strobe pulse will pass through the AND-gate 27 and will trigger the monostable multivibrator 29. As described with reference to FIG. 2, the output pulse of the AND-gate 27 is also the motion anticipation pulse which is applied to the stop sensing circuit 31 to indicate to the stop sensing circuit 31 that the bar 13 carrying the transducers is going to move. If the monostable multivibrator 29 produces an output pulse, it will mean that both of the solenoids 41 and 47 of one of the solenoid driving circuits are conducting. The output pulse produced by the monostable multivibrator 29 is a negative pulse, and this negative pulse is applied to the junction between the diodes 69 and 71 driving this junction negative. As a result, the anodes of the silicon controlled rectifiers 41 and 47 will be driven negative, turning both of the silicon controlled rectifiers 41 and 47 off. The output pulse from the monostable multivibrator 27 is applied to the similar point in each solenoid driving circuit. The silicon controlled rectifiers 41 and 47 will remain off until the end of the output pulse of the monostable multivibrator 29. When the output pulse of the monostable multivibrator 29 terminates, the strobe pulses applied to the AND-gates 37 and 43 will not yet have terminated so that the input signal applied to the channel 35 will cause the silicon controlled rectifier 41 to be rendered conductive if the input signal is negative and will cause the silicon controlled rectifier 47 to be rendered conductive if the input signal is positive. In this manner, one of the silicon controlled rectifiers 41 and 47 is rendered conductive, and one of the coils of the solenoid will be energized in accordance with the input signal on channel 35 from the address register. If the coil that is energized is different from the coil that was energized prior to the application of the strobe pulses to the gates 37 and 43, then the solenoid will be driven to its opposite position.

Thus, the circuit of the present invention utilizes silicon controlled rectifers to drive the coils of the solenoids and also uses these silicon controlled rectifiers to store information as to the condition of the driving circuit prior to the application of the new address signal to the solenoid driving circuit so that an output signal can be produced to indicate whether or not the bar 13 carrying the transducing heads is going to move or not. If no motion is anticipated, then the access may be obtained to the selected magnetic track immediately and the access time is greatly reduced.

Figures 4, 5:
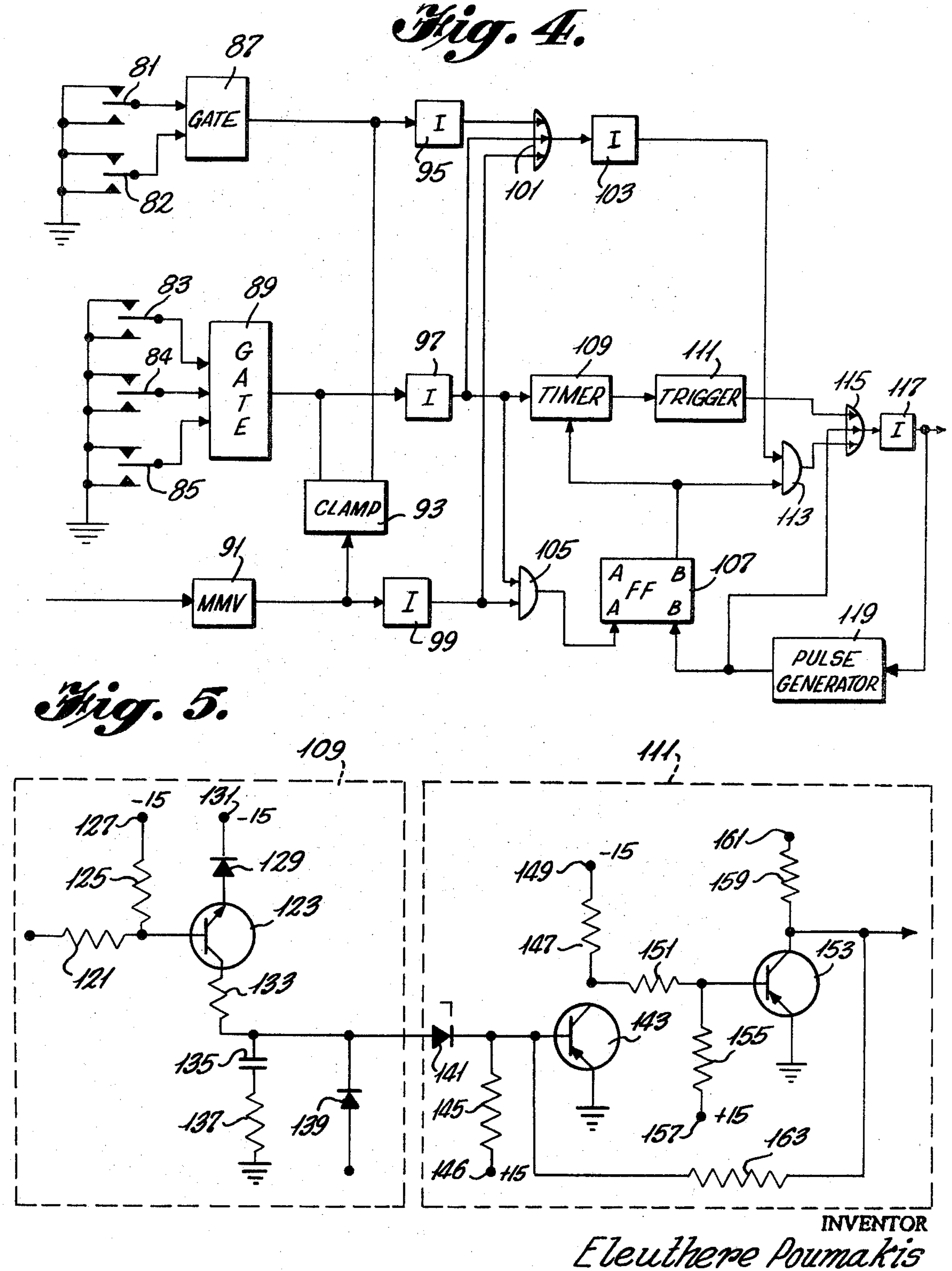
FIG. 4 is a block diagram illustrating a portion of the system shown in FIG. 2 in more detail.
FIG. 5 is a circuit diagram illustrating a portion of the block diagram in FIG. 4 in detail.

FIG. 4 is a block diagram illustrating the details of the stop sensing circuit 31. In FIG. 4, the contacts which are mounted upon the armatures 17 of the solenoids are designated by the reference numbers 81–85. Each of the contacts 81–85 will be closed and will connect to ground when the arm on which such contact is mounted is in either of its two positions, but will be open when the armature on which such contact is mounted is between positions.

The whiffletree positioning linkage operates to move the bar 13 carrying the transducers a different amount in response to a change in positions of the armature of each solenoid. A change of positions of the armature on which the contact 81 is mounted will cause each transducer to move just to an adjacent track. A change of position of the armature on which the contact 82 is mounted will cause a movement of the transducers corresponding to two tracks. A change of position of the armatures on which the contacts 83, 84 or 85 are mounted will cause a transducer movement corresponding to four, eight, or 16 tracks, respectively. Motion resulting from a change of position of only one or both of the armatures on which the contacts 81 and 82 are mounted is called minor motion, since the transducers will move an amount corresponding to only one to three tracks. Motion resulting from a change of position of the armatures on which the contacts 83, 84, and 85 are mounted is called major motion, since the transducers may move an amount corresponding to four or more tracks. It has been determined that when the movement of the transducers is minor motion, the transducers will be in their proper position as soon as both of the contacts 81 and 82 are closed following a 20-millisecond interval after the motion anticipation pulse. Accordingly, if the motion is minor motion, it can be determined when the transducers have completed their movement to a new position simply by sensing when the contacts 81 and 82 are both closed 20 milliseconds after the motion anticipation pulse. If the motion is major motion, this technique cannot be used because the contacts 83, 84, and 85 may both be closed at intermittent intervals before the transducers are properly positioned. In the case of repositioning of the transducers involving major motion, it could be determined that the transducers are in their new position by measuring the length of time that the contacts 83, 84, and 85 stay closed. When they all stay closed for a predetermined minimum interval, which would depend upon the particular characteristics of the positioning system such as its inertia and the speed of the response of the solenoids and which could be determined empirically, it would be known that the whiffletree positioning linkage had completed its operation and that the transducers were in their new positions ready to perform transducing operations. However, it can be determined more quickly that the transducers are properly in their new positions by adding together all of the intervals that all the contacts 83–85 are closed after the repositioning of the transducers in a major motion operation had started. When the sum of these intervals reaches a predetermined value, which is determined empirically, it will be known that the transducers are properly in their new positions following the repositioning operation.

The stop sensing circuit shown in FIG. 4, in response to a motion anticipation pulse, first changes the signal applied to the transducers from enabling to disabling so that the transducers cannot perform transducing operations, and then detects whether or not the change of transducer positions is going to be major motion or minor motion. If the change of position is going to be minor motion, the stop sensing circuit maintains the disabling signal applied to the transducers 33 for 20 microseconds and then as soon as all of the contacts 81–85 are closed, changes the signal applied to the transducers from disabling back to enabling. If the motion is determined to be major motion, the stop sensing circuit adds together the interval at which all the contacts 83–85 are closed, following the first opening of one of the contacts 83–85. When this sum reaches a predetermined empirically selected value, the circuit changes the signal applied to the transducers from disabling to enabling. If no motion anticipation pulse is applied to the stop sensing circuit, it merely continues to apply an enabling signal to the transducers so that access may be obtained immediately to the selected track following the registration of a new address in the address register 21, which new address does not require a change of positions of the transducers.

The contacts 81 and 82 are connected to the inputs of a gate 87, which will produce an output at ground potential if the voltage applied from both of the contacts 81 and 82 is at ground, but will produce a plus 15 volt output signal voltage if it does not receive a ground signal voltage from both of the contacts 81 or 82. Thus the output of the gate 87 will be at ground if both of the contacts 81 and 82 are closed, but will be at a plus 15 volts if either of the contacts 81 or 82 is open.

The contacts 83, 84, and 85 are connected to the inputs of a gate 89 which will produce an output signal voltage at ground if all three of the contacts 83, 84, and 85 are closed so as to be at ground, but will produce a plus 15 volt output if any one of the contacts 83, 84, or 85 is open. The motion anticipation pulse is applied to a monostable multivibrator 91 which will produce a 20-millisecond pulse in response to receiving the motion anticipation pulse. The output pulse of the monostable multivibrator is normally at minus 15 volts and rises to ground potential when it is producing its output pulse. The output pulse of the monostable multivibrator 91 is applied to a clamp 93 which clamps the outputs of the gates 87 and 99 at ground potential when the monostable multivibrator 91 is producing its output pulse. Thus the output of the gate 87 will be at ground potential if both of the contacts 81 and 82 are closed, or if the monostable multivibrator 91 is producing an output pulse. Likewise, the output of the gate 89 will be at ground potential if all three of the contacts 83–85 are closed, or if the monostable multivibrator 91 is producing an output pulse. The output of the gate 87 is applied to an inverter 95 which produces a ground output signal in response to a ground input signal and produces a minus 15 volt output signal voltage in response to a plus 15 volt input signal. The output of the gate 89 is applied to an inverter 97, which produces a ground output signal voltage in response to a ground input signal voltage and produces a minus 15 volt output signal in response to a plus 15 volt input signal. The output of the monostable multivibrator 91 is applied to an inverter 99, the output of which is normally at ground and which produces a minus 15 volt output signal in response to receiving the pulse from the monostable multivibrator 91.

The outputs from the inverters 95, 97, and 99 are applied to an OR-gate 101 which will produce a minus 15 volt output signal if it receives a minus 15 volt signal on any of its three inputs, but will produce a ground output signal voltage if it receives a ground input signal voltage on all three of its inputs. Thus the output of the OR-gate 101 will be a minus 15 volt signal if any of the contacts 81–85 are open, or if the monostable multivibrator 91 is producing its output pulse. The output signal of the OR-gate 101 is applied to an inverter 103, which produces a minus 15 volt output signal in response to a ground output signal in response to a minus 15 volt signal from the OR-gate 101. Thus the output of the inverter 103 will be at minus 15 volts preceding a motion anticipation pulse and will be switched to ground following a motion anticipation pulse and will remain at ground until all of the contacts 81–85 are closed simultaneously following the 20-millisecond pulse produced by the monostable multivibrator 91. If the change of motion of the transducers involves only minor motion, the transducers will be in position when the output of the inverter switches to minus 15 volts.

The outputs of the inverters 97 and 99 are applied to an AND-gate 105, the output of which is applied to a flipflop 107. The flip-flop 107 has two stable states designated as the A state and the B state. The AND-gate 105 will set the flip-flop 107 in its A state if the AND-gate 105 receives minus 15 volt signals on both of its inputs. Thus the flip-flop 107 will be set in its A state if one of the contacts 83–85 opens while the monostable multivibrator 91 is producing its output pulse, or in other words, if one of the armatures on which the contacts 83–85 are mounted moves during the 20 millisecond interval during which the output pulse of the monostable multivibrator 91 is being produced after receiving a motion anticipation signal.

The flip-flop 107 is used in this manner to determine whether the change of positions of the transducers is going to be major motion or minor motion. If one of the contacts 83–85 opens when the monostable multivibrator 91 is producing its output pulse, the motion is determined to be major motion and the flipflop 107 is set to its A state as described above. If one of the contacts 83–85 does not open during the output pulse of the monostable multivibrator 91, the motion is determined to be minor motion and the flip-flop 107 remains in its B state.

The output signal of the inverter 97 is applied to a timer 109, which comprises a capacitor that can be charged from a fixed voltage through a resistor. When the flip-flop 107 is set in its B state, it will discharge the capacitor of the timer 109 and the capacitor of the timer 109 will be maintained discharged for as long as the flip-flop 107 is in its B state. When the flip-flop 107 is in its A state, it will permit the capacitor of the timer 109 to charge but the capacitor of the timer will not charge unless it receives a ground signal voltage from the inverter 97. Thus after the flip-flop 107 has been switched to its A state, the capacitor of the timer 109 will begin to charge only when all three of the contacts 83–85 are closed. When the charge on the capacitor of the timer 109 reaches a predetermined value, it will enable a trigger circuit 111, which normally produces a ground output signal voltage, but which produces a minus 15 volt output signal upon being enabled by the timer 109. The capacitor of the timer will charge only while it receives a ground signal voltage from the inverter 97, and if this ground signal voltage should be interrupted because one of the contacts 83–85 opens, then the capacitor of the timer 109 will stop charging. The capacitor of the timer 109 will not be discharged when the ground signal from the inverter 97 is interrupted but will retain the charge that it has. Then when the ground signal voltage is reapplied to the timer 109 as a result of all the contacts 83–85 closing again, the charging of the capacitor 109 will resume. Thus the capacitor of the timer 109 will be charged after the flip-flop 107 has been set into its A state only during those intervals while all three of the contacts 83–85 are closed. Accordingly, the timer 109 adds together the time intervals that all three of the contacts 83–85 are closed, and when these time intervals reach a predetermined value, it will enable trigger 111. Since the capacitor of the timer 109 will not charge unless the flip-flop 107 is switched to its A state the timer 109 will not come into operation unless the change in position of the transducer involves major motion. Thus, the output of the trigger 111 will be changed from a ground signal voltage to a minus 15 volt output signal following a motion anticipation pulse if the transducer position change is to be major motion. This minus 15 volt signal will be produced by the trigger 111 when the sum of the timer intervals that all three of the contacts 83, 84, and 85 are closed following a motion anticipation pulse adds up to a predetermined empirically selected value. When these time intervals add up to this predetermined value, as evidenced by the charge on the capacitor of the timer 109 actuating the trigger 111, the transducers will be in their new position.

The output signal of the inverter 103 is applied to an AND-gate 113 which is also connected to receive an enabling signal from the flipflop 107 when the flip-flop 107 is in its B state. The AND-gate 113 will produce a minus 15 volt output signal if it receives an enabling signal from the flip-flop 107 and it receives a minus 15 volt signal from the inverter 103. Thus the AND-gate 113 will produce a minus 15 volt output signal if the flipflop 107 is in its B state, all of the contacts 81–85 are closed, and the monostable multivibrator 91 is not producing an output pulse.

If the AND-gate 113 produces a minus 15 volt output signal, it will indicate that the transducers are in position. This output signal from the AND-gate 113 will be produced following the registration of a new address in the address register which does not require motion of the transducing heads, as in this case no motion anticipation pulse will be produced. Accordingly, monostable multivibrator 91 will not produce its output pulse. Since the contacts 81–85 will remain closed all the conditions will be fulfilled for the AND-gate 113 to produce a minus 15 volt output signal indicating immediately that the transducers are in position. If the new address registered in the address register does require motion of the transducing heads, then the motion anticipation pulse will cause the monostable multivibrator 91 to produce its output pulse. Accordingly, while the monostable multivibrator 91 is producing its output pulse, the output of the AND-gate 113 will be at ground, indicating that the transducers are not yet in position.

If the motion of the transducers is minor motion, the flip-flop 107 will not be switched to its A state during the output pulse of the monostable multivibrator 91. Accordingly, following the output pulse of the monostable multivibrator, the flip-flop 107 will still be enabling the AND-gate 113. Thus the first time that all the contacts 81 through 85 are closed following an output pulse of the monostable multivibrator, the output of the AND-gate 113 will change from ground to minus 15 volts indicating that the transducers are in position.

If the motion is major motion, the flip-flop 107 will be switched to its A state during the output pulse of the monostable multivibrator 91 and accordingly will not enable the AND-gate 113. Accordingly, the output of the AND-gate 113 will not change from ground to minus 15 volts the first time that all the contacts 81–85 close following the output pulse of the monostable multivibrator 91.

It will be apparent that if the output of either the trigger 115 or the gate 113 is at minus 15 volts, the transducers will be in position. If the new address registered in the address register does not require motion, the output of the gate 113 will remain at minus 15 volts. If the new address requires minor motion, the output of the gate 113 will change to ground and then will switch back to minus 15 volts when the transducers are in their new position. If the new address requires major motion, the output of the gate 113 will change to ground and then when the transducers are in their new position, the output of the trigger 111 will change to minus 15 volts.

The outputs of the trigger 111 and the gate 113 are applied to an OR-gate 115, which will produce a minus 15 volt output signal when it receives a minus 15 volt signal on any of its inputs and which will produce a ground output signal if it receives a ground signal voltage on all of its inputs. Thus the output of the OR-gate 115 will change to ground following a motion anticipation pulse and will change back to minus 15 volts when the transducers are in their new position. The output of the OR-gate 115 is applied to an inverter 117 which will produce a ground output signal voltage in response to a minus 15 volt input signal and will produce a minus 15 volt output signal in response to a ground input signal. The output of the inverter 117 is applied to the transducers 24. A minus 15 volt signal will disable all of the transducers, whereas a ground output signal will enable the transducers. Thus the transducers 33 will be disabled following a motion anticipation pulse until the transducers are in their new position.

The output of the inverter 117 is also applied to a pulse generator 119, which in response to the output of the inverter 117 changing to ground from minus 15 volts will generate a minus 15 volt output pulse. The output pulse produced by the pulse generator 119 is applied to the flip-flop 107 to switch the flip-flop 107 back to its B state. The flip-flop 107 will then discharge the capacitor of the timer 109 so that the circuit will be ready to respond to the next motion anticipation pulse.

If the change of position of the transducers involves major motion, then at the time the pulse generator 119 produces its output pulse resetting the flip-flop 107 back to its A state, the output of the trigger 111 will be at minus 15 volts. The switching of the flipflop back to its B state will discharge the capacitor of the timer 109 so that the output of the trigger 111 will go back to ground. However, since the transducers will be in their new position at the time the pulse generator 119 produces its output pulse, the output of the inverter 103 will be at minus 15 volts. Accordingly, when the flipflop 107 switches back to its B state, the output of the gate 113 will change to minus 15 volts so that the output of the OR-gate 115 will still be at minus 15 volts after the capacitor of the timer 109 is discharged. To ensure that the output of the OR-gate 115 remains at minus 15 volts during the transition period when the flip-flop 107 is switching states, the minus 15 volt output pulse produced by the pulse generator 119 is also applied to an input of the OR-gate 115.

FIG. 5 illustrates the circuit details of the timer 109 and the trigger 111. The output signal of the inverter 97 is applied through a resistor 121 to the base of an NPN-transistor 123 in the timer 109 as shown in FIG. 5. The base of the transistor 123 is connected through a resistor 125 to a source of minus 15 volts applied to a terminal 127. The emitter of the transistor 123 is connected through a diode 129 to a source of minus 15 volts applied at a terminal 131. The diode 129 is poled to permit current flow from the emitter of the transistor 123 to the terminal 131. The collector of the transistor 123 is connected through a resistor 133 to one side of a capacitor 135, the other side of which is connected through a resistor 137 to ground.

The capacitor 135 is the capacitor of the timer 109. When the output of the inverter 97 is at ground, the transistor 123 will not conduct so that the capacitor 135 will not charge. When the output of the inverter 97 is at minus 15 volts, the transistor 123 will be rendered conductive so that the capacitor 135 will charge causing the potential at the junction between the resistor 133 and the capacitor 135 to change in a negative direction.

The flip-flop 107 is connected through a diode 139 to the junction between the resistor 133 and the capacitor 135. The flip-flop 107 applies a ground potential to this junction when the flip-flop 107 is in its B state. Thus, when the flip-flop 107 is in its B state, it will discharge the capacitor 135 and will maintain the capacitor 135 in its discharged condition. When the flip-flop 107 is switched to its A state, the applied voltage changes to minus 15 volts, which will back-bias the diode 139, so that the capacitor 135 can charge by means of the conduction through the transistor 123.

A diode 141 in the trigger 111 is connected between the base of a PNP-transistor 143 and the junction of the resistor 133 and the capacitor 135. The base of the transistor 143 is connected to a source of plus 15 volts applied at a terminal 146 through a resistor 145. The diode 141 is of the breakdown type and when the voltage at the junction between the capacitor 135 and the resistor 133 becomes sufficiently negative as a result of the charging of the capacitor 135, the diode 141 will break down to effect triggering of the trigger circuit 111.

The emitter of the transistor 143 is connected to ground and the collector of the transistor 143 is connected through a resistor 147 to a source of minus 15 volts applied at a terminal 149. The collector of the transistor 143 is also connected through a resistor 151 to the base of a PNP-transistor 153, the base of which is also connected through a resistor 155 to a source of plus 15 volts applied at a terminal 157. The emitter of the transistor 153 is connected to ground and the collector of the transistor 153 is connected through a resistor 159 to a source of minus 15 volts applied at a terminal 161. The collector of the transistor 153 is also connected through a resistor 163 to the base of the transistor 143.

Before the trigger circuit 111 is triggered by the breakdown of the diode 141, the transistor 143 will be biased non-conductive by the plus 15 volts applied at terminal 146. As a result, the voltage applied to the base of the transistor 153 will be negative rendering this transistor conductive so that the voltage of the collector of the transistor 153 is at ground. Thus the output of the trigger 111 taken from the collector of the transistor 153 will be at ground before the trigger 111 is triggered. When the capacitor 135 charges sufficiently to effect triggering of the trigger 111 by causing the breakdown of the diode 141, a negative voltage will be transmitted through the diode 141 to the base of the transistor 143 to render this transistor 143 conductive. As a result, the voltage at the collector of the transistor 143 will become less negative as will the voltage applied to the base of the transistor 153. As a result, the voltage at the collector of the transistor 153 will rise, causing the base of the transistor 143 to be driven more negative. Thus, the action is regenerative so that the transistor 143 is driven quickly to be fully conductive and the transistor 153 is driven quickly to cut-off. As a result, the output voltage of the trigger taken from the collector of the transistor 153 will rise sharply from ground to near minus 15 volts when the circuit 111 is triggered.

When the flip-flop 107 is switched to its B state and applies a ground potential to the junction between the resistor 133 and the capacitor 135, it will drop the voltage across the diode 141 sufficiently so that the diode 141 again becomes non-conductive. When the diode 141 becomes non-conductive, the voltage applied to the base of the transistor 143 will rise. Accordingly, regenerative action will again take place, this time rendering the transistor 153 conductive. Thus the output signal voltage produced at the collector of the transistor 153 will drop to ground. In this manner, the trigger circuit is switched back to its untriggered state in response to the capacitor 135 being discharged by the flip-flop 107 switching back to its B state.

The above-described system, by generating a motion anticipation pulse upon the registration of a new address only if the new address requires movement of the transducers and disabling the transducers in response to the motion anticipation pulse, makes it possible to gain access to the selected track immediately in those cases in which the new address does not require movement of the transducers. Thus the average access time is reduced.

The above description is of a preferred embodiment of the invention and many modifications may be made thereto without departing from the spirit and scope of the invention, which is defined in the appended claims.

What is claimed is:

1. A magnetic storage system comprising means defining a plurality of magnetic tracks operable to store recorded information, a magnetic transducer operable to perform transducing operations in each of said magnetic tracks, a plurality of pairs of electronic valves of the type which are rendered conductive by the application of an enabling signal to a gate electrode of the valve and which are rendered non-conductive by the application of a reverse voltage to the valve, control means corresponding to each pair of valves operable to be driven to a first condition in response to conduction of one electronic valve of the corresponding pair and to a second condition in response to the conduction of the other electronic valve of the corresponding pair, means selectively operable to apply a signal to the gate electrode of either electronic valve of each of said pairs, means responsive to both of said electronic valves being conductive to apply a reverse voltage to both the valves of such pair while the enabling signal is being applied to the gate electrode of one of the valves of such pair, said reverse voltage terminating before said enabling signal terminates, means to position said transducer in accordance with the combination of output conditions of said control means operating to position said transducer in transducing relationship with a different one of said magnetic tracks for each different combination of output conditions of said control means and means responsive to both the electronic valves of any one of said pairs being conductive to provide an output signal indicating that said transducer is going to be moved to a different track.

2. A magnetic storage system as recited in claim 1 wherein each of said control means is a solenoid having an actuator which is moved to a first position when such solenoid is in said first output condition and which is moved to a second position when such solenoid is in said second output condition.

3. A magnetic storage system as recited in claim 1 wherein each of said electronic valves is a silicon controlled rectifier.

4. A magnetic storage system as recited in claim 1 wherein there is provided means responsive to said motion anticipation signal to disable said transducer until said means to position said transducer has completed the operation of positioning said transducer in accordance with the output conditions of said control means.

5. A magnetic storage system comprising means defining at least two magnetic tracks for storing recorded information, a transducer operable to perform transducing operations in each of said magnetic tracks, first and second electronic valves of the type which are rendered conductive by the application of an enabling signal to a gate electrode and which are rendered non-conductive by the application of a reverse voltage to the valve, control means operable to be driven to a first condition in response to conduction of said first electronic valve and to a second condition in response to conduction of said second electronic valve, means selectively operable to apply enabling signals to the gate electrode of either said first electronic valve or said second electronic valve, means responsive to conduction of both of said electronic valves to apply a reverse voltage to both of said electronic valves while said enabling signal is being applied to the gate electrode of one of said electronic valves, said reverse voltage terminating before said enabling signal terminates, means to position said transducer in transducing relationship with a first one of said tracks in response to said control means being in said first position and to position said magnetic transducer in transducing relationship with another of said magnetic tracks in response to said control means being in said second condition, and means responsive to both of said valves conducting to provide an output signal indicating that said transducer is going to be moved to a different track.

6. A magnetic storage system as recited in claim 5 wherein each of said control means comprises a solenoid having an armature which is moved to a first position when such control means is in said first condition and is moved to a second position when such control means is in said second condition.

7. A magnetic storage system as recited in claim 5 wherein said electronic valves are silicon controlled rectifiers.

8. A magnetic storage system as recited in claim 5 wherein there is provided means responsive to said motion anticipation signal to disable said transducer until said means to position said transducer has moved said transducer to a new track.

9. A control circuit comprising first and second electronic valves of the type which are rendered conductive by the application of an enabling signal to a gate electrode and which are rendered non-conductive by the application of a reverse voltage to the valve, output device operable to be driven to a first condition in response to conduction of said first electronic valve and to a second condition in response to conduction of said second electronic valve, means selectively operable to apply an enabling signal to the gate electrode of either said first electronic valve or said second electronic valve, means responsive to both said electronic valves being conductive to apply a reverse voltage to both said electronic valves while said enabling signal is being applied to the gate electrode of one of said valves, said reverse voltage terminating before said enabling signal terminates, and means responsive to both of said valves conducting to provide an output signal indicating that said output device is going to change conditions.

10. A control circuit as recited in claim 9 wherein said output device comprises a positioner which moves to a first position when said output device is in a first condition and moves to a second position when said output device is in a second condition.

11. A control circuit as recited in claim 9 wherein said electronic valves comprise silicon controlled rectifiers.

12. A magnetic storage system comprising means defining a plurality of magnetic tracks operative to store recorded information, a plurality of magnetic transducers each movable to perform transducing operations in a plurality of said tracks, an address register for storing an address selecting one of said tracks, means responsive to the address stored in said register to select one of said transducers and move the selected transducer into transducing relationship with the selected track, means operative upon the registration of each new address in said address register to produce a motion anticipation signal only if such new address requires motion of the selected transducer, means to generate an in-position signal indication when the transducer selected by the new address arrives at the track selected by the new address, and means responsive to said motion anticipation signal to control the transducing operations of said transducers in a manner to permit transducing operations by the transducer selected by such new address immediately following the registration of such new address in said address register if said motion anticipation signal is not produced and to prevent transducing operations by the transducer selected by such new address at least in some instances until an interval after said in-position signal is generated if said motion anticipation signal is produced.

13. A magnetic storage system as recited in claim 12 wherein said transducers are mounted in a common support so that all of the transducers are movable together as a unit and wherein said means responsive to said motion anticipation signal disables all of said transducers at least in some instances until an interval after said in-position signal is generated if said motion anticipation signal is produced.

14. A magnetic storage system comprising means defining a plurality of magnetic tracks operative to store recorded information, a plurality of magnetic transducers each movable to perform transducing operations in a plurality of said tracks, an address register for storing an address selecting one of said tracks, a plurality of control means each having an armature selectively movable between a first position and a second position, means to operate said control means to position the armatures thereof in a combination of positions corresponding to the address stored in said address register, a mechanical linkage connecting said armatures with said transducers adapted to position said transducers in transducing relationship with a different set of tracks for each different combination of output positions of said armatures and positioning a selected one of said transducers in transducing relationship with the track selected by the address in said address register, means operative upon the registration of each new address in said address register to produce a motion anticipation signal only if such new address requires motion of said transducers to position a selected one of said transducers in transducing relationship with the track selected by the address in said address register, and means responsive to said motion anticipation signal to control the transducing operation of said transducers in a manner to permit transducing operations by a selected one of said transducers immediately following registration of a new address in said address register if said motion anticipation signal is not produced and to prevent transducing operations by said transducers until a selected one of said transducers has been moved into transducing relationship with the track selected by the address in said address register if said motion anticipation signal is produced.

15. A magnetic storage system comprising means defining a plurality of magnetic tracks operated to store recorded information, a magnetic transducer movable to perform transducing operations in a plurality of said tracks, means responsive to the address stored in said register to move said transducer into transducing relationship with the selected track, means operative upon the registration of each new address in said address register to produce a motion anticipation signal only if such new address required motion of said transducer, means to generate an in-position signal indication when said transducer arrives at the track selected by the new address in said address register, and means responsive to said motion anticipation signal to control the transducing operation of said transducer in a manner to permit transducing operations by said transducer immediately following the registration of a new address in said address register if said motion anticipation signal is not produced and to prevent transducing operations by said transducer at least in some instances until an interval after said in-position signal is generated if said motion anticipation signal is produced.

* * * * *